US011827061B2

(12) United States Patent
Mori

(10) Patent No.: US 11,827,061 B2
(45) Date of Patent: Nov. 28, 2023

(54) STUD PIN AND STUDDED TIRE

(71) Applicant: The Yokohama Rubber Co., LTD., Tokyo (JP)

(72) Inventor: Masakazu Mori, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 618 days.

(21) Appl. No.: 16/489,683

(22) PCT Filed: Feb. 28, 2017

(86) PCT No.: PCT/JP2017/007673
§ 371 (c)(1),
(2) Date: Aug. 28, 2019

(87) PCT Pub. No.: WO2018/158800
PCT Pub. Date: Sep. 7, 2018

(65) Prior Publication Data
US 2019/0366779 A1 Dec. 5, 2019

(51) Int. Cl.
*B60C 11/16* (2006.01)

(52) U.S. Cl.
CPC ...... *B60C 11/1668* (2013.01); *B60C 11/1625* (2013.01); *B60C 11/1643* (2013.01); *B60C 11/1656* (2013.01); *B60C 11/1675* (2013.01)

(58) Field of Classification Search
CPC ............. B60C 11/1625; B60C 11/1643; B60C 11/1656; B60C 11/1668; B60C 11/1675
See application file for complete search history.

(56) References Cited

U.S. PATENT DOCUMENTS

| 2004/0163746 A1* | 8/2004 | Eromaki | B29D 30/66 |
| | | | 152/210 |
| 2017/0349006 A1* | 12/2017 | Matsumoto | B60C 11/16 |

FOREIGN PATENT DOCUMENTS

| EP | 2 977 231 | | 1/2016 |
| EP | 3308983 A1 | * | 4/2018 |
| FI | 123780 B | * | 10/2013 |
| FI | 125983 B | * | 5/2016 |
| JP | S63-242703 | | 10/1988 |
| JP | 2016-097834 | | 5/2016 |

(Continued)

OTHER PUBLICATIONS

Machine translation for Finland 123780 B (Year: 2021).*
International Search Report for International Application No. PCT/JP2017/007673 dated Jun. 6, 2017, 4 pages, Japan.

*Primary Examiner* — Steven D Maki
(74) *Attorney, Agent, or Firm* — Thorpe North & Western

(57) ABSTRACT

A stud pin includes a tip including an end surface configured to come into contact with a road surface, a body portion configured to support the tip, and a lower flange. The flange profile shape of the lower flange is an anisotropic shape. The flange profile shape includes four or more first flange protrusion portions that project in the longitudinal direction and two second flange protrusion portions that project in the lateral direction. A tip profile shape of the tip is a shape including tip linear portions extending in a linear manner. At least one of the tip linear portions extends along a portion of the flange profile shape between two adjacent protrusion portions of the first flange protrusion portion and the second flange protrusion portion along the outer circumference of the flange profile shape.

9 Claims, 6 Drawing Sheets

(56) References Cited

FOREIGN PATENT DOCUMENTS

| KR | 10-2009-0132896 | 12/2009 |
| KR | 10-2015-0071293 | 6/2015 |
| WO | WO 2014/148262 | 9/2014 |
| WO | WO 2016/098394 | 6/2016 |
| WO | WO-2016/098394 A1 * | 6/2016 |
| WO | WO-2016/204128 A1 * | 12/2016 |

* cited by examiner

STUD PIN AND STUDDED TIRE

TECHNICAL FIELD

The present technology relates to a stud pin mounted in a tire and a studded tire.

BACKGROUND ART

In the related art, studded tires for use on icy and snowy roads include stud pins installed in a tread portion and provide grip on icy road surface.

Typically, a stud pin is embedded in a pin inserting hole (hereinafter, also referred to as simply "hole") provided in the tread portion. When a stud pin is embedded in a hole, the hole expands in diameter. By inserting the stud pin into the hole in this state, the stud pin is firmly fastened in the hole and the tread portion and mounted in the tread portion. As a result, the stud pin is prevented from falling out from the hole due to receiving breaking or accelerating forces or lateral forces from the road surface when the studded tire rolls. By preventing the stud pin from falling out, braking and driving properties and controllability on icy road surfaces are ensured.

A stud pin typically includes a tip including an end surface configured to come into contact with a road surface, and a body portion configured to support the tip. The tip includes an edge component on the end surface and can bite into the icy road surface due to the edge effect. Conventionally, the edge components of the end surface of the tip are increased to improve the biting force into the icy road surface. For example, the shape of an end surface of a tip has been given a concave polygonal shape to increase the edge components (see International Patent Publication No. WO 2016/098394).

When the biting force of the stud pin into the road surface is increased, the stud pin receives large shear forces from the road surface and may easily fall out from the pin inserting hole. The stud pin of International Patent Publication No. WO 2016/098394 can ensure a biting force into an icy road surface, however the effect of suppressing the stud pin falling out is insufficient. When the stud pin falls out, the braking and driving properties and controllability on icy road surfaces is decreased.

SUMMARY

The present technology provides a stud pin that can provide pin drop resistance and high braking and driving properties and controllability on icy road surfaces in a compatible manner and a studded tire installed with the stud pin.

An aspect of the present technology is a stud pin installable in a studdable tire, comprising:

a tip comprising an end surface that comes into contact with a road surface;

a body portion that supports the tip so that the tip projects from an end surface on one side of the body portion; and a lower flange connected to an end of the body portion on an opposite side to the end surface; wherein a flange profile shape of the lower flange as viewed from an arrangement direction of the tip, the body portion, and the lower flange is an anisotropic shape in which, of imaginary rectangles circumscribing the flange profile shape, a first smallest rectangle with a shortest side of its four sides being a smallest and/or a second smallest rectangle with a longest side of its four sides being a smallest comprise short sides and long sides of different lengths;

the flange profile shape comprises four or more first flange protrusion portions F1 that project toward a longitudinal direction and two second flange protrusion portions F2 that project toward a lateral direction;

a tip profile shape of the tip as viewed from the arrangement direction is a shape comprising tip linear portions extending in a linear manner; and at least one of the tip linear portions extending along a portion of the flange profile shape along an outer circumference of the flange profile shape between two adjacent protrusion portions of the first flange protrusion portions F1 and the second flange protrusion portions F2.

Preferably, the first flange protrusion portions F1 are constituted by two pairs of the first flange protrusion portions F1; and the tip profile shape comprises, as the tip linear portions, two tip linear portions C1 extending along a portion of the flange profile shape between each of the two pairs of the first flange protrusion portions F1 and four or more tip linear portions C2 extending along a portion of the flange profile shape between each of the second flange protrusion portions F2 and one of the first flange protrusion portions F1.

Preferably, the flange profile shape comprises two first flange recess portions F3 curved toward a centroid of the flange profile shape and disposed between each of the pairs of the first flange protrusion portions F1 and four second flange recess portions F4 curved toward the centroid, disposed between each of the second flange protrusion portions F2 and one of the first flange protrusion portions F1, and smoothly connect to one of the first flange protrusion portions F1; and the tip linear portions C1 are disposed facing the first flange recess portions F3, and the tip linear portions C2 are disposed facing the second flange recess portions F4.

Preferably, the tip profile shape comprises two tip recess portions recessed toward a centroid of the tip profile shape; and the tip recess portions comprise two of the tip linear portions connected together.

Preferably, a recess depth of the first flange recess portions F3 is equal to or greater than a recess depth of the second flange recess portions F4.

Preferably, the two second flange protrusion portions F2 comprise two flange linear portions parallel with the longitudinal direction; and the flange linear portions are portions projecting the most in the lateral direction.

Another aspect of the present technology is a studded tire that is a studdable tire installed with the stud pin described above, wherein the tip profile shape of the stud pin is anisotropic shape with a length of the body profile shape in the longitudinal direction parallel with the long sides being different from a length of the tip profile shape in the lateral direction parallel with the short sides, the studded tire comprising:

a tread portion in which the stud pin is installed with the longitudinal direction of the tip profile shape facing a tire lateral direction.

Preferably, the tread portion is installed with the stud pin with the longitudinal direction or the lateral direction facing a tire circumferential direction.

According to the present technology, a stud pin that can provide pin drop resistance and high braking and driving properties and controllability on icy road surfaces in a compatible manner, and a studded tire installed with the stud pin can be obtained.

DETAILED DESCRIPTION

Overall Description of Tire

Figure 1:
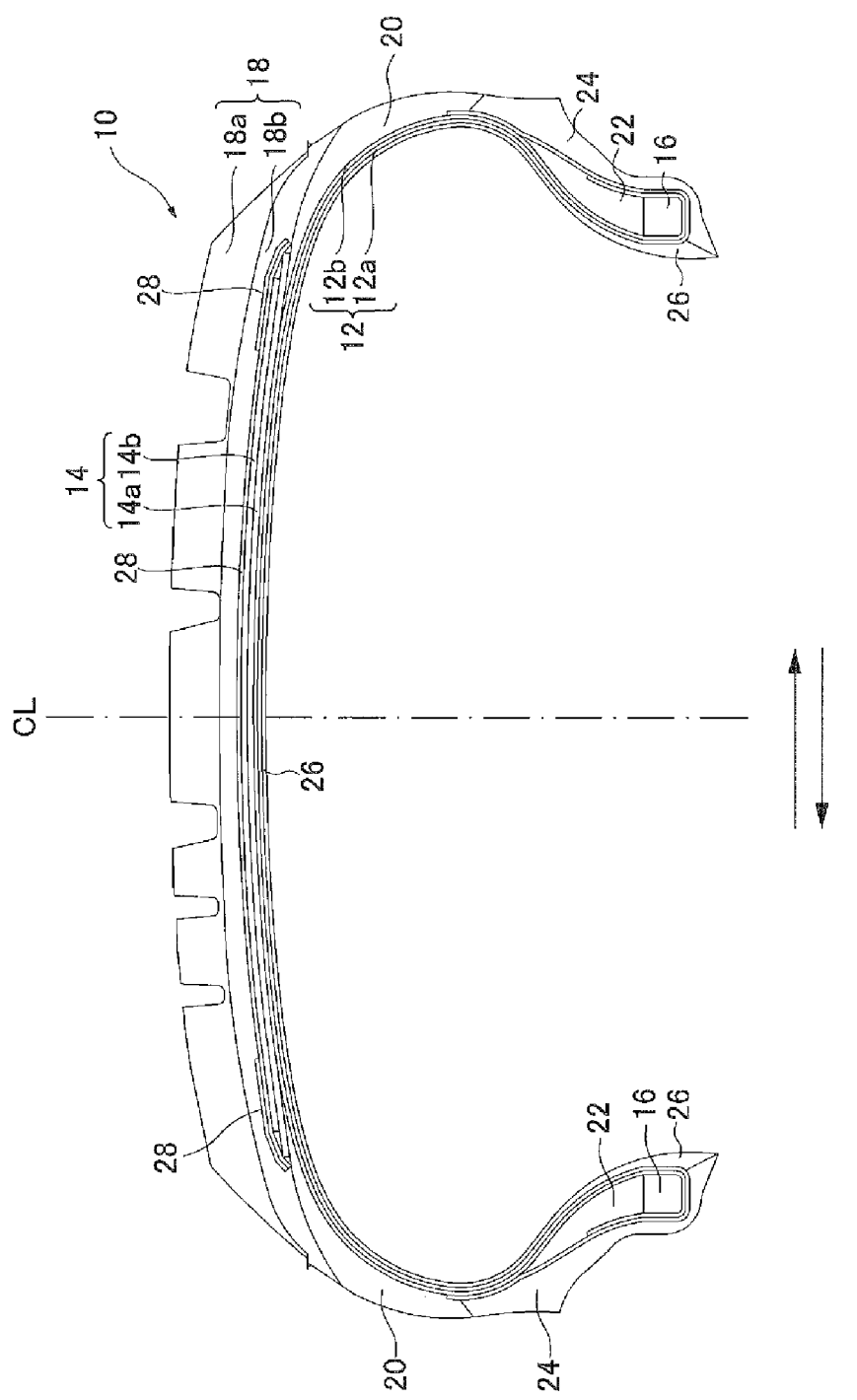
FIG. 1 is a tire cross-sectional view illustrating an example of a cross section of a tire of an embodiment.
Figure 2:
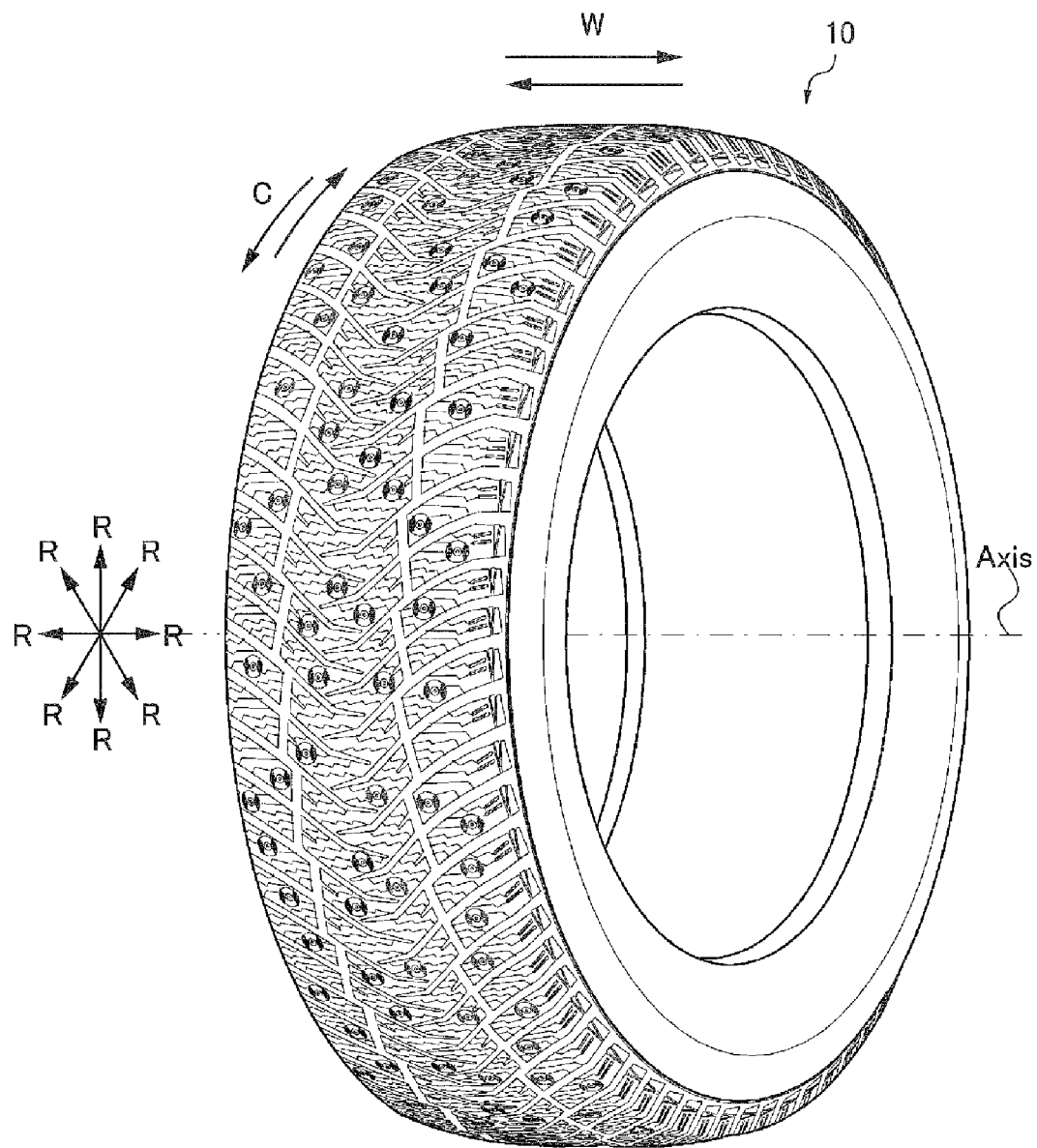
FIG. 2 is a perspective view of the tire of the present embodiment.

Hereinafter, a studded tire of the present embodiment is described. FIG. 1 is a tire cross-sectional view illustrating an example of a cross section of a studded tire (hereinafter also referred to as "tire") 10 of the present embodiment. FIG. 2 is a perspective view of the tire 10.

The tire 10 is a tire with stud pins embedded in a tread portion (the stud pins are not illustrated in FIGS. 1 and 2).

The tire 10 is, for example, a tire for a passenger vehicle. A tire for a passenger vehicle refers to a tire specified in Chapter A of the JATMA Year Book 2012 (standards of The Japan Automobile Tyre Manufacturers Association, Inc.). The tire can also be a small truck tire specified in Chapter B or a truck tire or bus tire specified in Chapter C.

Values of the dimensions of various pattern elements are described in detail below as example values for a tire for a passenger vehicle. However, the studded tire is not limited to these example values.

"Tire circumferential direction C" described below (see FIG. 2) refers to the direction the tread surface rotates when the tire 10 rotates about a tire rotation axis Axis (see FIG. 2). "Tire radial direction R" refers to the direction that extends radially orthogonal to the tire rotation axis Axis. "Outward in the tire radial direction" refers to the direction away from the tire rotation axis Axis in the tire radial direction R. "Tire lateral direction W" refers to the direction parallel with the tire rotation axis Axis. "Outward in the tire lateral direction" refers to the direction away from a tire equator line CL (see FIG. 3) of the tire 10.

Tire Structure

The tire 10 includes a carcass ply 12, a belt 14, and bead cores 16 as framework members. The tire 10 also mainly includes a tread rubber 18, side rubbers 20, bead filler rubbers 22, rim cushion rubbers 24, and an innerliner rubber 26 around the framework members.

The carcass ply 12 includes carcass ply members 12a, 12b that are formed from organic fibers covered with rubber and that are wound between the pair of bead cores 16 of an annular shape so as to be formed into a toroidal shape. In the tire 10 illustrated in FIG. 1, the carcass ply 12 is made of the carcass ply members 12a and 12b, but may also be made of a single carcass ply member. The belt 14 is provided outward of the carcass ply 12 in the tire radial direction and is constituted of two belt members 14a, 14b. The belt 14 is a member formed from steel cords covered with rubber, the steel cords being arranged inclined at a predetermined angle, for example, 20 to 30 degrees, with respect to the tire circumferential direction C. The width in the tire lateral direction of the belt member 14a that is a lower layer is greater than the width of the belt member 14b that is the upper layer. The steel cords of the two layers of the belt members 14a and 14b are inclined from the tire circumferential direction C toward the tire lateral direction W in mutually different directions. As such, the belt members 14a, 14b are crossing layers serving to suppress expansion of the carcass ply 12 due to the pressure of the air in the tire.

The tread rubber 18 is disposed outward of the belt 14 in the tire radial direction. Both end portions of the tread rubber 18 connect to the side rubbers 20 to form sidewall portions. The tread rubber 18 is made of two layers of rubber, namely an upper layer tread rubber 18a provided on the outer side in the tire radial direction and a lower layer tread rubber 18b provided on the inner side in the tire radial direction. The rim cushion rubbers 24 are provided at the ends of the side rubbers 20 on the inner side in the tire radial direction, and come into contact with the rim on which the tire 10 is mounted. The bead filler rubbers 22 are provided outward of the bead cores 16 in the tire radial direction so as to be interposed between a portion of the carcass ply 12 before where it is wound around the bead cores 16 and a portion of the carcass ply 12 after where it is wound around the bead cores 16. The innerliner rubber 26 is provided on the inner surface of the tire 10 facing a tire cavity region that is filled with air and is surrounded by the tire 10 and the rim.

In addition, the tire 10 includes a belt cover layer 28 formed from organic fiber covered with rubber that covers the belt 14 from the outer side in the tire radial direction of the belt 14.

The tire 10 has such a tire structure, but the tire structure of the present embodiment is not limited to the tire structure illustrated in FIG. 1.

Tread Pattern

Figure 3:
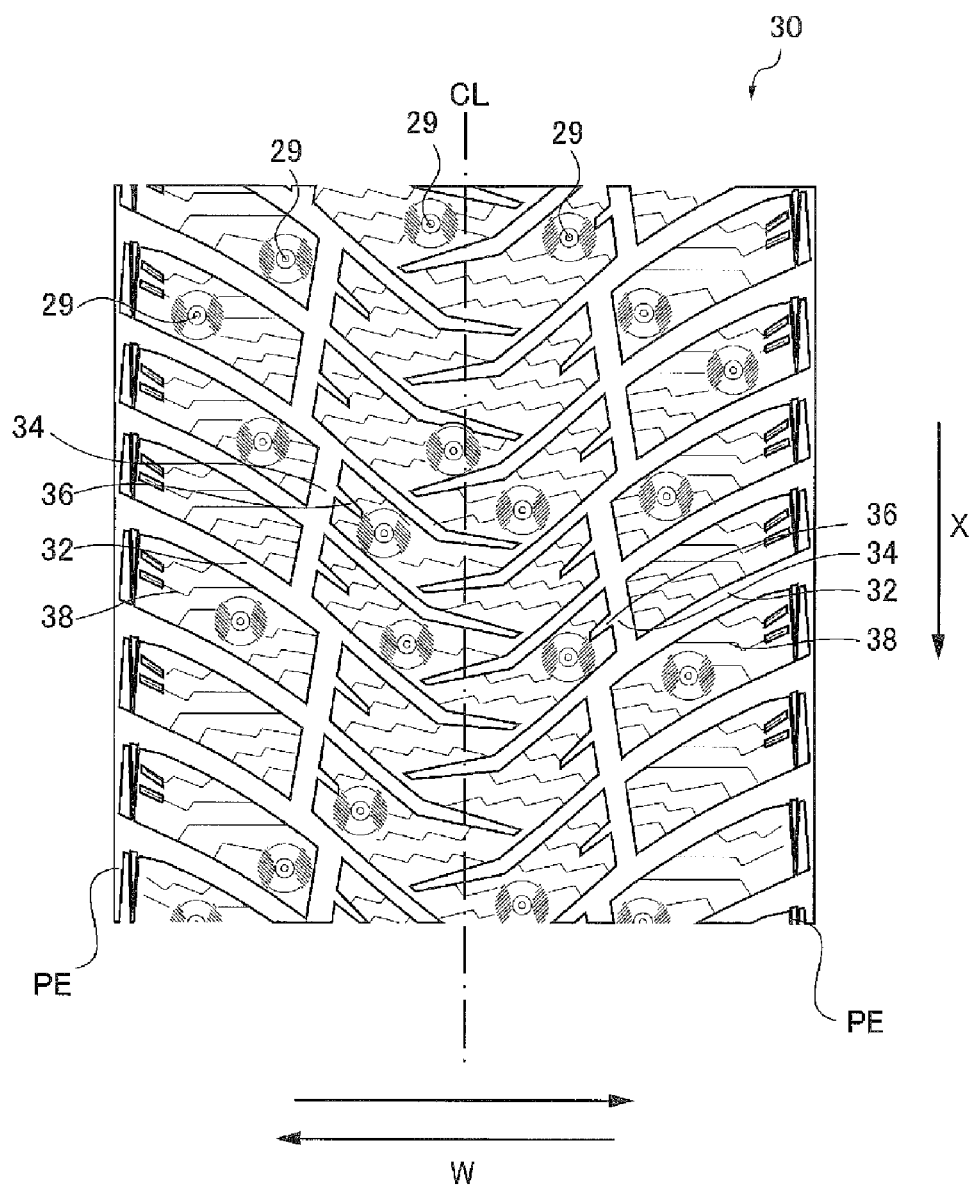
FIG. 3 is a developed plan view illustrating a portion of an example of a tread pattern of the studded tire of the present embodiment, developed on a plane.

FIG. 3 is a developed plan view illustrating a portion of an example of the tread pattern, namely a tread pattern 30, of the tire 10 developed on a plane. In FIG. 3, the stud pins installed in the tread portion are omitted from the illustration. As illustrated in FIG. 3, the tire 10 has a designated rotation direction X indicating a one-way direction along the tire circumferential direction C. Orientation information of the rotation direction X is illustrated by an information display portion including numbers, symbols, and the like (e.g., an arrow symbol) on the sidewall surface of the tire 10. The stud pins (see FIG. 4A) are installed in a plurality of pin inserting holes 29 illustrated in FIG. 3.

The tread pattern 30 includes an inclined groove 32, a circumferential direction communicating groove 34, a projecting groove 36, and a sipe 38.

A plurality of the inclined groove 32 are formed at predetermined intervals in the tire circumferential direction (vertical direction in FIG. 3).

The inclined groove 32 extends in a direction opposite (the up direction in FIG. 3) the tire rotation direction X (the down direction in FIG. 3) and outward in the tire lateral direction. The inclined groove 32 has a starting end at a position near the tire equator line CL on one side of the tire equator line CL in the tire lateral direction W, crosses the tire equator line CL and advances toward the other side in the tire lateral direction W, and ends at a pattern end PE.

The groove width of the inclined groove 32 gradually increases from the starting end near the tire equator line CL. The inclination with respect to the tire lateral direction W of the inclined groove 32 is the smallest in a region near the tire equator line CL including the starting end and, after crossing the tire equator line CL, bends so as that the inclination angle with respect to the tire lateral direction W increases, and advances outward in the tire lateral direction in a direction opposite the tire rotation direction X. Furthermore, the inclination angle gradually decreases with advancement outward in the tire lateral direction. The inclined grooves 32 configured as described above are provided on both sides of the tire equator line CL.

The inclined grooves 32 provided on one side of the tire equator line CL of the tread portion are offset with respect to the tire circumferential direction C from the inclined grooves 32 provided on the other side. The starting ends of the inclined grooves 32 on one side do not connect with the inclined grooves 32 provided on the other side.

Of the plurality of inclined grooves 32 provided in the tire circumferential direction C, the inclined grooves 32 that are adjacent are in communication via the circumferential direction communicating groove 34. More specifically, the circumferential direction communicating groove 34 extends in the tire circumferential direction C from a position partway along one of the inclined grooves 32, crosses a second inclined groove 32 that is adjacent to the first inclined groove 32 in the tire circumferential direction C, and advances to a third inclined groove 32 that is adjacent to the second inclined groove 32. That is, the circumferential direction communicating groove 34 starts at one of the inclined grooves 32 (first inclined groove 32), extends along the tire circumferential direction C from the first inclined groove 32 at which the circumferential direction communicating groove 34 starts, and terminates at a second inclined groove 32. In this way, the circumferential direction communicating groove 34 is provided so as to connect three of the inclined grooves 32 that are adjacent along the tire circumferential direction C. The circumferential direction communicating groove 34 is inclined with respect to the tire circumferential direction C so as to approach the tire equator line CL with advancement in the direction opposite to the tire rotation direction X.

The projecting groove 36 projects in a direction toward the tire equator line CL from the circumferential direction communicating groove 34, and is provided so as to terminate prior to reaching the tire equator line CL.

Land portions of the tread portion are separated into a center region and shoulder regions by the inclined grooves 32 and the circumferential direction communicating grooves 34. A plurality of the sipes 38 connected to the inclined grooves 32 and the circumferential direction communicating grooves 34 is provided in the center region and both of the shoulder regions of the tread portion.

Furthermore, the plurality of the pin inserting holes 29 are provided in the center region and both of the shoulder regions of the tread portion.

The inclined groove 32, the circumferential direction communicating groove 34, and the projecting groove 36 have a groove depth of, for example, from 8.5 mm to 10.5 mm, and a maximum groove width of 12 mm. The tread pattern illustrated in FIG. 3 is an example, and the tread pattern of the tire in which the stud pins of the present embodiment are installed in is not limited to the embodiment illustrated in FIG. 3.

Stud Pin

Figure 4A:
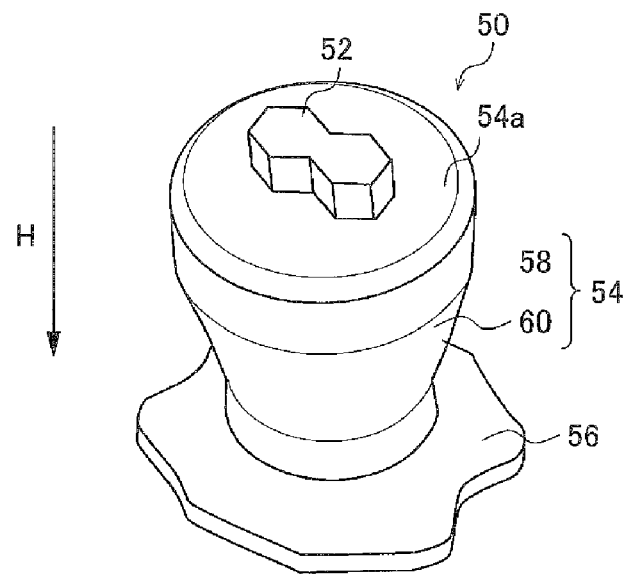
FIG. 4A is a perspective view of a stud pin of the present embodiment.
Figure 4B:
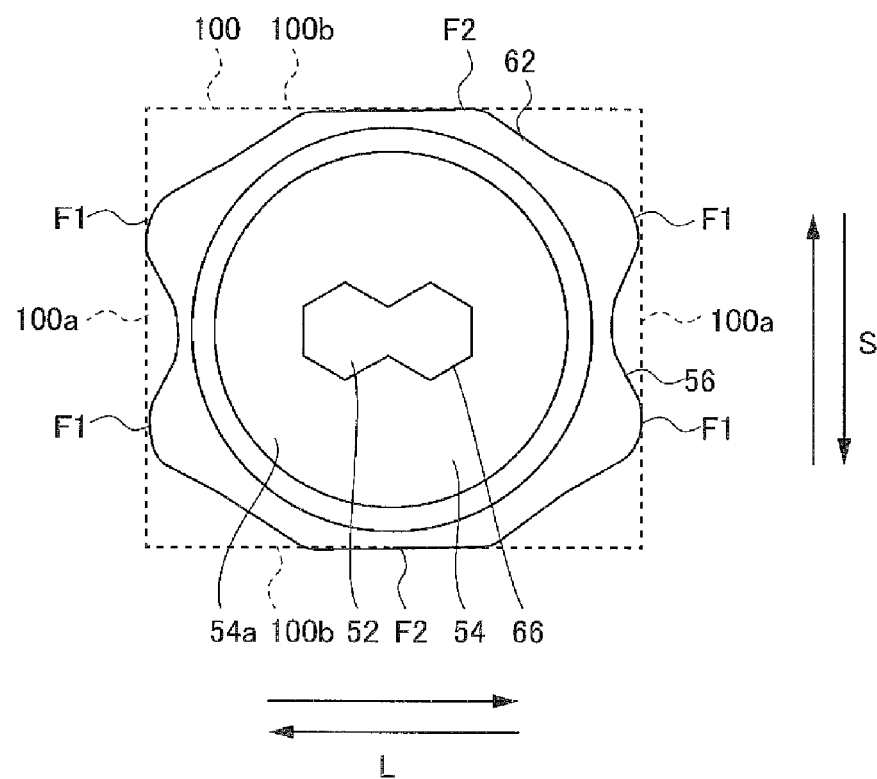
FIG. 4B is a plan view of the stud pin of the present embodiment.

FIG. 4A is a perspective view of a stud pin 50 of the present embodiment. FIG. 4B is a plan view of the stud pin 50 of the present embodiment.

The stud pin 50 includes a tip 52, a body portion 54, and a lower flange 56. The body portion 54 includes an upper flange 58 and a shank portion 60. When installed in the pin inserting holes 29 of the tire 10, the body portion 54 and the lower flange 56 are embedded in the tread rubber 18 (see FIG. 1) and are in contact with the tread rubber 18.

The tip 52 includes a tip end surface that comes into contact with a road surface. The tip 52 is formed from tungsten carbide or a similar hard metal. According to an embodiment, the tip 52 may be formed from a cermet material. The tip 52 is fixed in a hole provided in an upper end surface 54a of the body portion 54. The tip 52 of the stud pin 50 is configured to protrude from the tread surface when the stud pin 50 is installed in the tire 10.

The body portion 54 is a portion that supports the tip 52 with the tip 52 projecting from the upper end surface 54a on one side. The body portion 54 extends in the direction opposite to the projection direction of the tip 52. The extension direction of the body portion 54 is also the direction in which the tip 52, the body portion 54, and the lower flange 56 are arranged, and this direction is referred to as the H-direction.

The upper flange 58 of the body portion 54 is configured so that, when embedded in the tread portion of the tire 10, the tip 52 protrudes from the tread surface. The tip 52 is fixed on upper end surface 54a of the body portion 54.

The lower flange 56 is configured to come into contact with a bottom of the pin inserting hole 29, when embedded in the tread portion of the tire 10. The lower flange 56 is connected to the end of the shank portion 60 on the opposite side of the upper end surface 54a of the body portion 54.

The shank portion 60 is the portion that connects the upper flange 58 and the lower flange 56. The cross section of the shank portion 60 in the direction orthogonal to the H-direction is thinner than the cross sections of the upper flange 58 and the lower flange 56.

The material of the body portion 54 is not particularly limited but is preferably different from the material of the tip 52. According to an embodiment, the body portion 54 is formed from aluminum alloy or the like in order to reduce the weight of the stud pin 50.

In the present embodiment, as illustrated in FIG. 4B, the profile shape of the end surface of the tip 52 (tip profile shape) is a shape including tip linear portions that linearly extend when the tip 52 is viewed from the H-direction. In the example illustrated in FIG. 4B, a tip profile shape 66 is a concave polygonal shape. The concave polygonal shape is a shape in which a plurality of convex polygons are connected so that one side of adjacent convex polygons is shared or that one of the vertex angles overlaps with each other. In the example illustrated in FIG. 4B, the tip profile shape 66 is a concave decagon formed by two regular hexagons joined together on one side. However, according to an example, the tip profile shape 66 is also preferably another concave polygonal shape. The convex polygon that forms the other concave polygons, for example, may be a polygon such as a rectangle, pentagon, heptagon, octagon, or the like. In this case, the polygon may be a regular polygon, or may be a polygon other than a regular polygon. The number of sides of the convex polygons connected to each other may be equal or different.

Also, according to an example, the tip profile shape 66 is also preferably a convex polygonal shape. The convex polygonal shape is, for example, a polygon such as an octagon, a nonagon, a decagon, or the like. In this case, the polygon may be a regular polygon, or may be a polygon other than a regular polygon. Additionally, according to an example, as illustrated in FIG. 4B, the tip profile shape 66 is preferably constituted by only tip linear portions. However, according to an example, the tip profile shape 66 is preferably a concave polygonal shape, a convex polygonal shape, or a concave polygonal shape or a convex polygonal shape with a portion changed to an arc shape forming a protrusion portion, an arc shape forming a recess portion, or a wavy line shape with undulations.

According to an embodiment, as illustrated in FIG. 4B, the tip profile shape 66 is preferably an anisotropic shape with the length of the tip profile shape 66 in the longitudinal direction L and the length of the tip profile shape 66 in the lateral direction S being different from one another.

In the present embodiment, as illustrated in FIG. 4B, the profile shape of the upper flange 58 is circular when the upper flange 58 is viewed from the H-direction. However, according to an embodiment, the profile shape of the upper flange 58 is preferably an elliptical shape, a curved line shape including a plurality of arc shapes, a convex polygonal shape, a concave polygonal shape, or a shape thereof with a portion changed to a linear shape, an arc shape forming a recess portion, or a wavy line shape with undulations.

A flange profile shape 62 of the lower flange 56 is an anisotropic shape when the lower flange 56 is viewed from the H-direction. Here, as illustrated in FIG. 4B, the anisotropic shape is a shape in which, of imaginary rectangles circumscribing the flange profile shape 62 inclined in various directions, a first smallest rectangle with the shortest side of it four sides being the shortest and/or a second smallest rectangle with the longest side of its four sides being the shortest includes short sides and long sides of different lengths. In FIG. 4B, a first smallest rectangle 100 is illustrated. In this example, the first smallest rectangle 100 includes a side 100a corresponding to the shortest of the shortest sides. The first smallest rectangle 100 also corresponds to the second smallest rectangle. In other words, the second smallest rectangle includes a side 100b corresponding to the shortest of the longest sides. The side 100a of the sides of the first smallest rectangle 100, which is also the second smallest rectangle, is a short side, and the side 100b is a long side. Accordingly, the flange profile shape 62 of the lower flange 56 is an anisotropic shape.

The flange profile shape 62 of the lower flange 56 with such an anisotropic shape includes four first flange protrusion portions F1 that project in the longitudinal direction L parallel with the long side (side 100b) and two second flange protrusion portions F2 that project in the lateral direction S parallel with the short side (side 100a). Hereinafter, the side 100b is referred to as "long side 100b", and the side 100a is referred to as "short side 100a".

Here, "first flange protrusion portion F1" means the portion formed in a protruding shape protruding in the longitudinal direction L located in a region separated in the longitudinal direction L, a distance equal to or greater than half of the distance from a straight line parallel with the lateral direction S that goes through the center of the first smallest rectangle 100 (the intersection point of two diagonal lines) to the short side 100a from the parallel straight line. "Protruding shape" refers to the shape of a portion that approaches the parallel straight line (a straight line parallel with the lateral direction S that extends through the center of the first smallest rectangle 100) as it extends outward on both sides to the outer circumference of the flange profile shape 62 from a point on the flange profile shape 62.

"Second flange protrusion portion F2" is the portion formed in a protruding shape protruding in the lateral direction S located in a region separated in the lateral direction S, a distance equal to or greater than half of the distance from a straight line parallel with the longitudinal direction L that goes through the center of the first smallest rectangle 100 (the intersection point of two diagonal lines) to the long side 100b from the parallel straight line. "Protruding shape" refers to the shape of a portion that approaches the parallel straight line (a straight line parallel with the longitudinal direction L that extends through the center of the first smallest rectangle 100) as it extends outward on both sides to the outer circumference of the flange profile shape 62 from a point on the flange profile shape 62.

In the present embodiment, the flange profile shape 62 of the lower flange 56 includes the four first flange protrusion portions F1 and the two second flange protrusion portions F2. Two of the first flange protrusion portions F1 face a first direction of the longitudinal direction L, and the other two first flange protrusion portions F1 face a second direction opposite to the first direction. One of the second flange protrusion portions F2 faces a third direction of the lateral direction S, and the other second flange protrusion portion F2 faces a fourth direction opposite to the third direction. The number of the first flange protrusion portions F1 facing the first direction of the longitudinal direction L is the same as the number of first flange protrusion portions F1 facing the second direction. According to an embodiment, preferably, three of the first flange protrusion portions F1 face the first direction of the longitudinal direction L and the other first flange protrusion portion F1 faces the second direction opposite to the first direction, and one of the second flange protrusion portions F2 faces a third direction of the lateral direction S and the other second flange protrusion portion F2 faces a fourth direction opposite to the third direction.

Additionally, according to an embodiment, the flange profile shape 62 of the lower flange 56 preferably includes five, six, or seven first flange protrusion portions F1 and two second flange protrusion portions F2. In this embodiment, the number of the first flange protrusion portions F1 facing the first direction of the longitudinal direction L may be the same as or different to the number of first flange protrusion portions F1 facing the second direction.

In the present embodiment, at least one of the tip linear portions extends along a portion of the lower flange 56 (also referred to as portion between protrusion portions below) between two adjacent protrusion portions of the first flange protrusion portion F1 and the second flange protrusion portion F2 along the outer circumference of the flange profile shape 62. Here, "the tip linear portions extend along a portion between protrusion portions" refers to the tip linear portion extending in the direction the portion between protrusion portions extends around the outer circumference of the flange profile shape 62. "The direction the portion between protrusion portions extends around the outer circumference of the flange profile shape 62" refers to the direction (also referred to as inclination direction below) an imaginary straight line joining both ends of the portion between protrusion portions is inclined with respect to the longitudinal direction L. In the case in which the portions between protrusion portions are first flange recess portions F3 or second flange recess portions F4, the ends of the portions between protrusion portions are ends of a recess portion. In the case in which the recess portions and the protrusion portions are arc shaped or have a shape including a plurality of arcs, the ends are set as follows. In other words, from the recess portion, partway as it extends toward the protrusion portions adjacent to the recess portion on both sides, the position of the boundary where the center of the radius of curvature shifts from outward of the flange profile shape to on or inward of the outer circumference of the flange profile shape corresponds to the ends of the recess portion. Furthermore, "the portion between protrusion portions of the tip linear portion extending in the inclination direction" refers to the tip linear portion extending in a direction with an angular difference to the inclination direction of the portion between protrusion portions within a predetermined angle range (for example, 15 degrees or less).

The portion between protrusion portions of the lower flange 56 has an increase surface area per unit volume of the lower flange 56 and an increased contact area with the tread rubber 18. As a result, the friction force constraining the movement of the stud pin 50 receiving the shear force from the icy road surface is great between the portion between protrusion portions and the inner wall surface of the pin inserting hole 29, and the holding force that prevents the stud pin 50 from falling out from the pin inserting hole 29 is increased. The tip linear portion extends in a direction along the portion between protrusion portions. As a result, the stud pin 50 is firmly held in the pin inserting hole 29 when the stud pin 50 receives shear force from the direction the portion between protrusion portions are located and the tip 52 can bite into the icy road surface via an edge effect. In this way, the stud pin 50 does not easily fall out from the pin inserting hole 29 and have excellent controllability and braking and driving properties on icy road surfaces.

Furthermore, in the present embodiment, the flange profile shape 62 of the lower flange 56 includes four of the first flange protrusion portions F1 and two of the second flange protrusion portions F2. Thus, as described below, rotation of the stud pin 50, which is an initial cause of the stud pin 50 falling out, can be suppressed, allowing the stud pin 50 falling out from the pin inserting hole 29 to be further prevented.

Specifically, the flange profile shape 62 of the lower flange 56 includes the large second flange protrusion portion F2 along the long side 100b. This increases the holding strength to prevent the movement of the stud pin 50 that receives shear force from an icy road surface to incline and fall out from the pin inserting hole. As a result, the stud pin 50 does not easily fall out from the pin inserting hole 29.

In the case of the stud pin 50 falling out from the studded tire, the stud pin 50 falls out while rotating in the hole. In other words, prior to the stud pin 50 falling out from the pin inserting hole 29, the stud pin 50 rotates in the pin inserting hole 29. Typically, when the stud pin 50 receives shearing force from the icy road surface, the stud pin 50 inclines so as to fall against the pin inserting hole 29 in which it is installed. This reduces the fastening force on the stud pin 50 from the hole 29. In this way, the stud pin can easily rotate about the center axis in the pin inserting hole 29. Furthermore, when a large shear force is received from the icy road surface, the fastening force of the pin inserting hole 29 decreases, allowing the stud pin 50 to rotate around the center axis. When the stud pin 50 rotates, the resistance of the pin inserting hole 29 and the tread rubber 18 holding the stud pin 50 in the pin inserting hole 29 against the shear force received from an icy road surface is decreased, and the stud pin 50 is more likely to fall out from the pin inserting hole 29. However, the flange profile shape 62 of the lower flange 56 of the stud pin 50 includes four of the first flange protrusion portions F1 and has undulations, and the lower flange 56 is fastened and fixed in the pin inserting hole 29 with the tread rubber 18 deformed corresponding to these undulations. Thus, a gap is not easily formed between the stud pin 50 and the pin inserting holes 29 due to the stud pin 50 inclining in a collapsing direction when the stud pin 50 receives a shear force from an icy road surface. As a result, the lower flange 56 can be tightly fastened by the tread rubber 18 (the inner wall surface of the pin inserting hole), and the rotation of the stud pin 50 in the pin inserting holes 29 which is an initial cause of the stud pin 50 falling out can be suppressed. Thus, the stud pin 50 of the present embodiment can further suppress the stud pin 50 from falling out.

Additionally, in the present embodiment, the flange profile shape 62 includes four of the first flange protrusion portions F1. This further increases the braking and driving properties and controllability on icy road surfaces.

Specifically, even when the stud pin 50 receives shear force from an icy road surface, a gap between the stud pin 50 and the pin inserting hole 29 is not easily formed, and the stud pin 50 is not easily moved out of position in the pin inserting hole 29 (does not come loose). As a result, the stud pin 50 does not easily fall out from the pin inserting hole 29, the shear force between the stud pin 50 and an icy road surface is efficiently transferred to the belt 14, to the entire studded tire 10, and to the vehicle mounted with the studded tire 10. Thus, the braking and driving properties and controllability on icy road surfaces is further improved.

In this way, the effect of suppressing the stud pin 50 from falling out from the pin inserting hole 29 is great, and the stud pin has excellent controllability and braking and driving properties on icy road surfaces. In other words, the stud pin 50 can provide pin drop resistance and controllability and braking and driving properties on icy road surfaces in a compatible manner.

Figure 5:
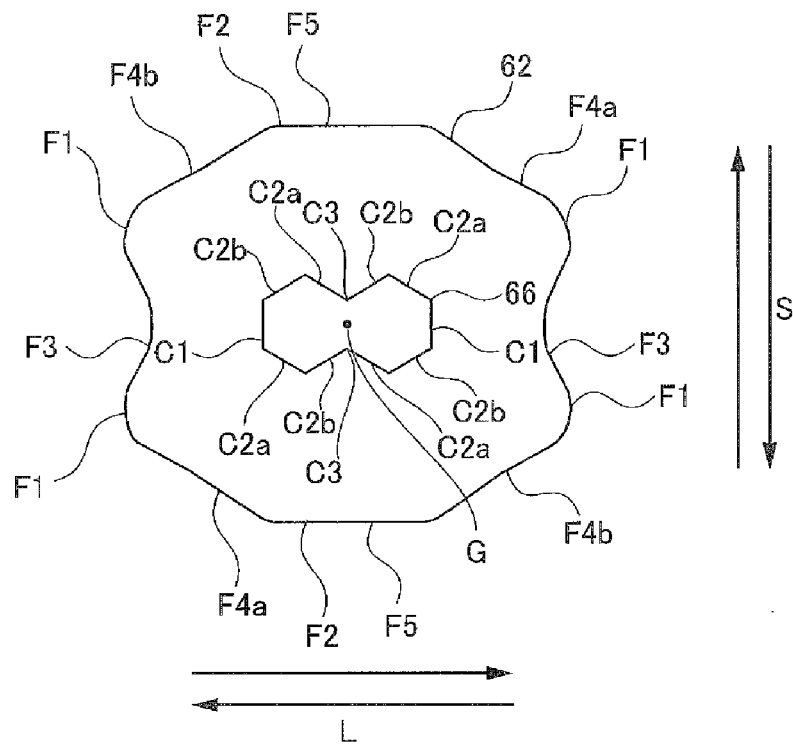
FIG. 5 is a diagram illustrating the profile shape of the lower flange and a tip according to an embodiment.

FIG. 5 is a diagram illustrating the flange profile shape 62 of the lower flange 56 and the tip profile shape 66 of the tip 52 according to an embodiment.

According to an embodiment, the tip profile shape 66 preferably includes tip linear portions C2 (in FIG. 5, denoted as C2a and C2b) that extend along the portions between protrusion portions corresponding to the portions between protrusion portions of the flange profile shape between the first flange protrusion portions F1 and the second flange protrusion portions F2 adjacent along the outer circumference of the flange profile shape 62. In such a configuration, the arrangement of the portion between protrusion portions and the tip linear portion extending along the portion between protrusion portions is located at a plurality of positions (four positions in the example illustrated in FIG. 5) around the center axis of the stud pin 50 (in FIG. 5, a line extending in a direction vertically from the sheet that passes through the centroid G of the flange profile shape 62). Thus, with respect to shear force from various directions, the stud pin 50 can provide controllability and braking and driving properties on icy road surfaces in a compatible manner. Note that in FIG. 5, the centroid G is the same as the centroid of the tip 52 and the body portion 54.

According to an embodiment, also, the tip profile shape 66 preferably includes four or more tip linear portions C2 that extend along the portions between protrusion portions corresponding to the portions between protrusion portions of the flange profile shape 62 between the first flange protrusion portions F1 and the second flange protrusion portions F2 adjacent along the outer circumference of the flange profile shape 62.

Specifically, in the example illustrated in FIG. 5, of the ten tip linear portions of the tip profile shape 66, four tip linear portions C2a extend along the second flange recess portions F4a conforming to the two second flange recess portions F4a, and four tip linear portions C2b extend along the second flange recess portions F4b conforming to the two second flange recess portions F4b. In the example illustrated in FIG. 5, four second flange recess portions F4 are included in the flange profile shape 62, and thus, 16 tip linear portions extend along the four second flange recess portions F4.

According to an embodiment, as illustrated in FIG. 5, the first flange protrusion portion F1 is constituted by two pairs of first flange protrusion portions F1. In other words, when in the plan view of FIG. 5, two first flange protrusion portions F1 projecting leftward in the longitudinal direction L is defined as one pair, and two first flange protrusion portions F1 projecting rightward in the longitudinal direction L is defined as the other pair. Here, the tip profile shape 66 preferably includes two tip linear portions C1 as tip linear portions that extend along facing the portion of the flange profile shape 62 between each pair of first flange protrusion portions F1. Furthermore, preferably four or more (for example, four or eight) tip linear portions C2 are disposed extending along the portions of the flange profile shape 62 between each of the second flange protrusion portions F2 and one of the first flange protrusion portions F1. In such a configuration, the arrangement of the portion between protrusion portions and the tip linear portion extending along the portion between protrusion portions is located at a plurality of positions around the center axis of the stud pin 50. Thus, with respect to shear force from various directions, the stud pin 50 can provide controllability and braking and driving properties on icy road surfaces in a compatible manner.

Specifically, in the example illustrated in FIG. 5, of the ten tip linear portions of the tip profile shape 66, the two tip linear portions C1 other than the four tip linear portions C2a and the four tip linear portions C2b extend along the first flange recess portion F3 facing the first flange recess portion F3. In the example illustrated in FIG. 5, two first flange recess portions F3 are included in the flange profile shape 62, and two tip linear portions C1 that extend along and face the two first flange recess portions F3 are included.

According to an embodiment, the flange profile shape 62 preferably includes two first flange recess portions F3 that are curved toward the centroid of the flange profile shape 62 and are disposed between each pair of the first flange protrusion portions F1. Furthermore, the flange profile shape 62 preferably includes four second flange recess portions F4 that are curved toward the centroid, are disposed between each of the second flange protrusion portions F2 and one of the first flange protrusion portions F1, and smoothly connect to one of the first flange protrusion portions F1. Here, furthermore, the tip linear portions C1 are preferably disposed facing the first flange recess portions F3, and the tip linear portions C2 are preferably disposed facing the second flange recess portions F4.

The flange profile shape 62 of the lower flange 56 includes the first flange recess portions F3. Thus, when the lower flange 56 comes into contact with the inner wall surface of the pin inserting holes 29, the area of the contact surface in the lateral direction S is increased. This improves the holding strength preventing the movement of the stud pin 50 to fall out of the pin inserting hole 29. As a result, the stud pin 50 can be suppressed from falling out from the pin inserting hole 29.

Additionally, the flange profile shape 62 of the lower flange 56 includes the second flange recess portion F4 at four sections, forming four recesses around the circumference of the flange profile shape 62. As a result, the installing fingers of a stud pin installation device used in installing the stud pin 50 into the pin inserting hole 29 can more easily grip the lower flange 56 of the stud pin 50. In other words, when the installing fingers grip the lower flange 56 with an anisotropic shape, the stud pin 50 is gripped such that the anisotropic shape takes a suitable orientation and can be installed in the pin inserting hole 29. This improves pin installation properties.

According to an embodiment, preferably the tip profile shape 66 includes two tip recess portions C3 recessed toward the centroid of the tip profile shape 66, and the tip recess portions C3 include two tip linear portions connected together. With such tip recess portions C3, the edge components of the end surface of the tip 52 are increased at a position close to the centroid of the tip profile shape 66. As a result, the biting force into the icy road surface is increased, and controllability and braking and driving properties on icy road surfaces are further improved. However, when the edge components are increased, the shear force the stud pin 50 receives when the tip 52 bites into the icy road surface is increased. However, as described above, in the portion between protrusion portions of the lower flange 56, the holding force that prevents the stud pin 50 from falling out from the pin inserting hole 29 is increased, so the stud pin 50 does not easily fall out, and high controllability and braking and driving properties on icy road surfaces are obtained.

According to an embodiment, the tip recess portions C3 preferably include three or more tip linear portions including a tip linear portion extending in a direction parallel with the longitudinal direction L.

Figure 6:
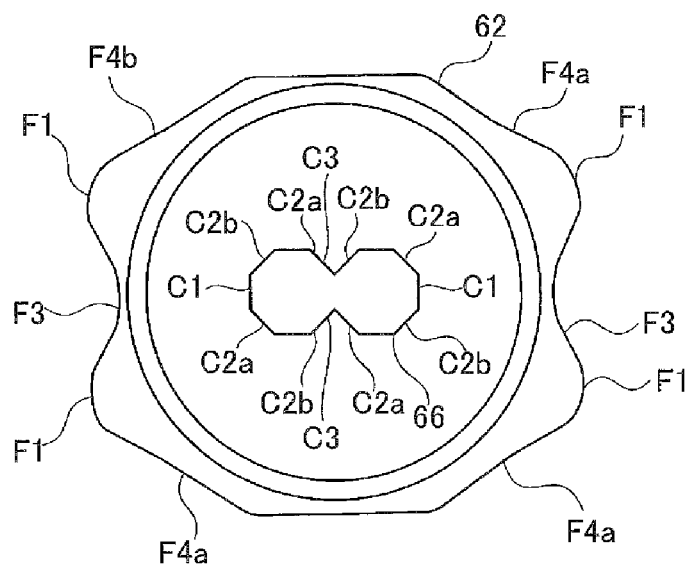
FIG. 6 is a plan view of the stud pin of an embodiment.

FIG. 6 is a plan view of the stud pin 50 of an embodiment.

According to an embodiment, the tip profile shape 66 preferably has a shape other than that illustrated in FIG. 4B. For example, as illustrated in FIG. 6, the tip profile shape 66 preferred has a shape in which two regular octagons are connected together sharing one side. In the example illustrated in FIG. 6, of the 14 tip linear portions of the tip profile shape 66, four tip linear portions C2a extend along the second flange recess portions F4a conforming to the two second flange recess portions F4a, and four tip linear portions C2b extend along the second flange recess portions F4b conforming to the two second flange recess portions F4b. Additionally, of the 14 tip linear portions of the tip profile shape 66, the two tip linear portions C1 extend along the first flange recess portion F3 facing the first flange recess portion F3. Note that in the example illustrated in FIG. 6, the tip profile shape 66 includes four tip linear portions (in FIG. 6, tip linear portions extending in a direction parallel with the longitudinal direction) that do not extend along the second flange recess portion F4 or the first flange recess portion F3.

According to an embodiment, as illustrated in FIG. 5, the recess depth of the first flange recess portions F3 is preferably the same as the recess depth of the second flange recess portions F4 or greater than the recess depth of the second flange recess portions F4. Here, "recess depth" refers to the distance from a straight line connecting two of the first flange recess portions F3 on either side of the first flange recess portion F3 or the second flange recess portion F4 or a straight line connecting one of the first flange protrusion portions F1 to one of the second flange protrusion portions F2 to a point locate farthest from the first flange recess portion F3 or the second flange recess portion F4. With a shape in which the recess depth is defined as such, the area of the contact surface in the lateral direction S where the lower flange 56 comes into contact with the inner wall surface of the pin inserting hole 29 can be increased, and the recess on the side in the lateral direction S can be enlarged. This allows the rotation of the stud pin 50 to be further suppressed. Furthermore, holding strength to prevent the stud pin 50 from falling out from the pin inserting hole is increased.

According to an embodiment, the curved shape of the first flange recess portions F3 and the curved shape of the second flange recess portions F4 are preferably arc shapes with a set radius of curvature. In the case of the curved shape of the first flange recess portions F3 and the curved shape of the second flange recess portions F4 being formed with a single radius of curvature, the radius of curvature of the first flange recess portions F3 is preferably equal to or less than the radius of curvature of the second flange recess portions F4. For example, to improve the holding strength described above, the radius of curvature of the first flange recess portions F3 is preferably equal to or less than 50% of the radius of curvature of the second flange recess portions F4.

According to an embodiment, as illustrated in FIG. 5, the two second flange protrusion portions F2 include two flange linear portions F5 parallel with the longitudinal direction L. The flange linear portions F5 are preferably the portions projecting the most in the lateral direction S. With such a configuration, the installing fingers of a stud pin installation device used in installing the stud pin 50 into the pin inserting hole 29 can more easily grip the lower flange 56 of the stud pin 50. For example, in the case of the flange linear portions F5 being at the gripping position of the installing fingers, when the gripping position of the installing fingers strays from the predetermined position along the flange linear portions F5, the range of the flange linear portions F5 which the installing fingers can grip is large allowing the stud pin 50 to be stability gripped. As a result, the number of times the stud pin 50 is incorrectly installed in the pin inserting holes 29 is reduced.

According to an embodiment, as illustrated in FIG. 5, the two first flange recess portions F3 are preferably formed with a line symmetrical shape about a first imaginary straight line parallel with the lateral direction S and extending through a centroid G and/or formed with a line symmetrical shape about a second imaginary straight line parallel with the longitudinal direction L and extending through the centroid G. In this way, when the stud pin 50 is installed in the pin inserting hole 29, the installing fingers can easily grip the stud pin 50 with a target orientation.

According to an embodiment, as illustrated in FIG. 5, the four second flange recess portions F4 are preferably formed with a line symmetrical shape about a first imaginary straight line parallel with the lateral direction S and extending through the centroid G and/or formed with a line symmetrical shape about a second imaginary straight line parallel with the longitudinal direction L and extending through the centroid G. In this way, when the stud pin 50 is installed in the pin inserting hole 29, the installing fingers can easily grip the stud pin 50 with a target orientation.

According to an embodiment, as illustrated in FIG. 5, in the case of the flange profile shape 62 includes two of the flange linear portions F5, the two flange linear portions F5 are preferably formed with a line symmetrical shape about a first imaginary straight line parallel with the lateral direction S and extending through the centroid G and/or formed with a line symmetrical shape about a second imaginary straight line parallel with the longitudinal direction L and extending through the centroid G. In this way, when the stud pin 50 is installed in the pin inserting hole 29, the installing fingers can easily grip the stud pin 50 with a target orientation.

According to an embodiment, as illustrated in FIG. 5, the two second flange protrusion portions F2 include two flange linear portions F5 parallel with the longitudinal direction L. The flange linear portions F5 are preferably the portions projecting the most in the lateral direction S. Also, both ends of the two flange linear portions F5 preferably connect with two of the second flange recess portions F4 of the four second flange recess portions F4. In other words, one second flange protrusion portion F2 is preferably formed by one of the flange linear portions F5 and two of the second flange recess portions F4. In this way, by the lower flange 56 including the second flange protrusion portion F2 projecting greatly in the lateral direction S, the holding strength to prevent the stud pin 50 from falling out from the pin inserting hole 29 is increased.

The stud pin 50 including the tip profile shape 66 with an anisotropic shape is installed in a tire with the longitudinal direction L of the tip profile shape 66 facing the tire lateral direction W. In this case, when the tip profile shape 66 also includes the tip recess portion C3, the edge components of the tip linear portions at a position near the centroid of the tip profile shape 66 are increased. Thus, the braking and driving properties on icy road surfaces are improved. Here, "the longitudinal direction L of the tip profile shape 66 facing the tire lateral direction W" refers to the longitudinal direction L of the tip profile shape 66 being inclined with respect to the tire lateral direction W with a predetermined angle range (for example, 15 degrees or less).

Figure 7A:
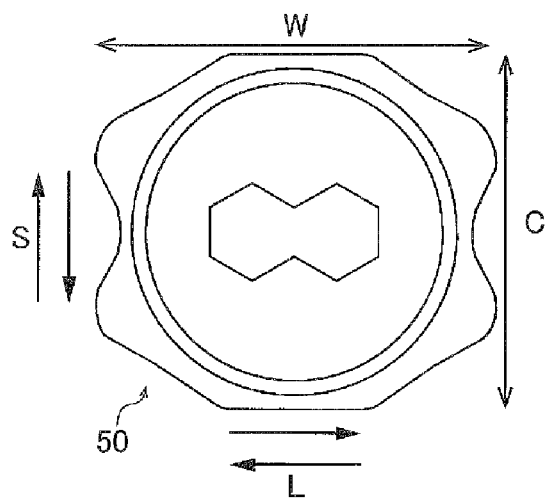
FIGS. 7A and 7B are diagrams illustrating the orientation of the stud pin installed in the tire.
Figure 7B:
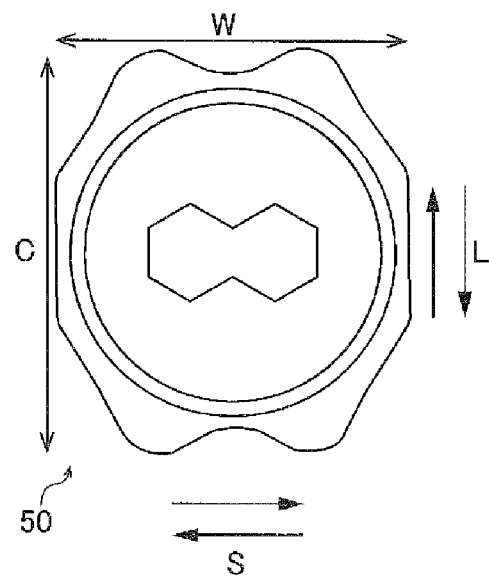

Additionally, the stud pin 50 including the flange profile shape 62 of the lower flange 56 with an anisotropic shape is installed in a tire, for example as described below. FIGS. 7A and 7B are diagrams illustrating the orientation of the stud pin 50 installed in the tire.

FIG. 7A illustrates an example in which the stud pin is installed in the pin inserting hole 29 with the longitudinal direction L of the lower flange 56 facing the tire lateral direction W and the lateral direction S being aligned with the arrangement direction facing the tire circumferential direction C. FIG. 7B illustrates an example in which the stud pin is installed in the pin inserting hole 29 with the lateral direction S of the lower flange 56 facing the tire lateral direction W and the longitudinal direction L being aligned with the arrangement orientation of the stud pin 50 facing the tire circumferential direction C. Here, "the longitudinal direction L of the lateral direction S of the lower flange 56 facing the tire lateral direction W" refers to the longitudinal direction L or the lateral direction S of the lower flange 56 being inclined with respect to the tire lateral direction W with a predetermined angle range (for example, 15 degrees of less).

In the example illustrated in FIG. 7A, the tip recess portion C3 is disposed facing the second flange protrusion portion F2 at a position on the centroid G side of the second flange protrusion portion F2. Here, "the tip recess portion C3 being disposed facing the second flange protrusion portion F2" refers to the position on the flange linear portion F5 furthest separated from the centroid G being on a line connecting a recessed bottom position of the tip recess portion C3 closest to the centroid G and the centroid G.

As illustrated in FIG. 7A, when the stud pin 50 is disposed with the lateral direction S corresponding to the tire circumferential direction C, the stud pin 50 that receives a lateral force as sheer force inclines, collapsing in the pin inserting hole 29. However, the lower flange 56 is tightly fastened by the tread rubber 18 deformed corresponding to the undulations formed by the four first flange protrusion portions F1 of the lower flange 56 at the inner wall surface of the pin inserting hole 29. Thus, a gap is not easily formed (does not come loose) between the stud pin 50 and the pin inserting hole 29 due to the stud pin 50 inclining in the tire lateral direction W. Accordingly, the stud pin 50 does not easily rotate in the pin inserting hole 29. Thus, the stud pin 50 is suppressed from falling out from the pin inserting hole 29, and also the edge effect of the tip linear portions C1 improves the controllability and braking and driving properties on icy road surfaces. Also, the lateral forces are efficiently transferred from the stud pin 50 to the belt 14 via the tread rubber 18, improving the response of the studded tire to lateral forces. Additionally, the second flange recess portion F4 is the portion facing an inclined direction with respect to the tire lateral direction W. Thus, even when turning with braking/driving engaged, if the orientation of the lateral force received by the stud pin 50 is inclined, the inner wall surface of the pin inserting hole 29 fastens around the protrusion portions (the first flange protrusion portions F1 and the second flange protrusion portions F2) on either side of the second flange recess portion F4 and the second flange recess portion F4. This improves the response of the studded tire to lateral forces. Additionally, the pin drop resistance when turning and controllability on snowy and icy road surfaces are improved by the edge effect of the tip linear portions C2 extending in a direction corresponding to the second flange recess portions F4. Furthermore, the flange profile shape 62 of the lower flange 56 includes the large second flange protrusion portion F2 facing the tire circumferential direction C. This increases the holding strength to prevent the movement of the stud pin 50 to incline and fall out from the pin inserting hole when the stud pin 50 receives a large breaking or accelerating force when breaking or driving. As a result, braking and driving properties on icy road surfaces is improved, as well as pin drop resistance when breaking or driving. In this way, the effect of suppressing the stud pin 50 installed as illustrated in FIG. 7A from falling out from the pin inserting hole 29 is great, and the stud pin has excellent controllability and braking and driving properties on icy road surfaces.

In the example illustrated in FIG. 7B, the tip recess portion C3 is disposed facing the first flange recess portion F3 at a position on the centroid G side of the first flange recess portion F3. Here, "the tip recess portion C3 being disposed facing the first flange recess portion F3" refers to the position on the first flange recess portion F3 furthest separated from the centroid G being on a line connecting a recessed bottom position of the tip recess portion C3 closest to the centroid G and the centroid G.

As illustrated in FIG. 7B, when the stud pin 50 is disposed with the longitudinal direction L corresponding to the tire circumferential direction C, the stud pin 50 that receives braking force and driving force as sheer force inclines, collapsing in the pin inserting hole 29. However, the lower flange 56 is tightly fastened by the tread rubber 18 deformed corresponding to the undulations formed by the four first flange protrusion portions F1 of the lower flange 56 at the inner wall surface of the pin inserting hole 29. Thus, a gap is not easily formed (does not come loose) between the stud pin 50 and the pin inserting hole 29 due to the stud pin 50 inclining in the tire circumferential direction from the icy road surface. Accordingly, the stud pin 50 is does not easily rotate in the pin inserting hole 29 and is suppressed from falling out from the pin inserting hole 29. Also, the breaking or accelerating force is efficiently transferred from the stud pin 50 to the belt 14 via the tread rubber 18, improving the response of the studded tire to breaking or accelerating forces. In other words, the braking ability on ice is improved. Additionally, the second flange recess portion F4 is the portion facing an inclined direction with respect to the tire lateral direction W. Thus, even when breaking or accelerating with a slip angle, in a case where the orientation of the breaking or accelerating force received by the stud pin 50 is inclined, the inner wall surface of the pin inserting hole 29 tightly fastens around the protrusion portions (the first flange protrusion portions F1 and the second flange protrusion portions F2) on either side of the second flange recess portion F4 and the second flange recess portion F4. This improves the response of the studded tire to breaking and accelerating. Additionally, the pin drop resistance when breaking or accelerating and braking and driving properties on snowy and icy road surfaces are improved by the edge effect of the tip linear portions C2 extending in a direction corresponding to the second flange recess portions F4. Furthermore, the flange profile shape 62 of the lower flange 56 includes the large second flange protrusion portion F2 facing the tire lateral direction W. This increases the holding strength to prevent the movement of the stud pin 50 to incline and fall out from the pin inserting hole when the stud pin 50 receives a large lateral force when turning. As a result, controllability on icy road surfaces is improved, as well as pin drop resistance when turning. In this way, the effect of suppressing the stud pin 50 installed as illustrated in FIG. 7B from falling out from the pin inserting hole 29 is great, and the stud pin has excellent controllability and braking and driving properties on icy road surfaces.

As can be seen, with a configuration in which the flange profile shape 62 has an anisotropic shape with the first smallest rectangle or the second smallest rectangle circumscribing the flange profile shape 62 being a rectangle, the flange profile shape 62 includes four or more first flange protrusion portions F1 projecting toward the longitudinal direction L and two second flange protrusion portions F2 projecting toward the lateral direction S, the tip profile shape 66 includes the tip linear portions, and at least one of the tip linear portions of the tip profile shape 66 extends along the portion between protrusion portions of the flange profile shape 62, the stud pin 50 can provide pin drop resistance and controllability and braking and driving properties on icy road surfaces in a compatible manner.

Additionally, according to an embodiment, the orientation of the stud pin 50 installed in an inner region near the tire equator line CL of the tread portion is preferably set as the orientation illustrated in FIG. 7A or FIG. 7B, and the orientation of the stud pin 50 installed in an outer region outward from the inner region in the tire lateral direction is preferably set as the orientation illustrated in the other FIG. 7A or FIG. 7B. The degree of the effect on braking and driving properties and controllability depends on the position on the tread portion in the tire lateral direction. Thus, to efficiently improve braking and driving properties and controllability, the orientation of the stud pin 50 illustrated in FIG. 7A or FIG. 7B is preferably selectively selected depending on the position in the tire lateral direction where the stud pin 50 is installed.

Examples, Conventional Example, and Comparative Examples

Stud pins including lower flanges with different flange profile shapes and tips with different tip profile shapes were manufactured. The manufactured stud pins were embedded in tires 10 with the configuration illustrated in FIGS. 1 to 3 to manufacture studded tire. These studded tires were mounted to a passenger vehicle test vehicle, and the stud pins were evaluated. The stud pins were installed so that the longitudinal direction of the lower flange faced the tire lateral direction.

The size of each manufactured tire was 205/55R16. The passenger vehicle used was a front-wheel drive sedan with an engine displacement of 2000 cc. The internal pressure condition of the tires was 230 (kPa) for both the front wheels and rear wheels. The load condition of the tires was a 450 kg load on the front wheels and a 300 kg load on the rear wheels. The evaluation items for the stud pins are as follows.

Pin Drop Resistance

The proportion (%) of the number of stud pins remaining in the tread rubber to the total number of installed stud pins was obtained after a test vehicle had travelled 15000 km on a dry road surface including asphalt road surfaces or concrete road surfaces. A proportion of 95% or greater is evaluated as there being no practical problem with regard to pin drop.

Braking Ability on Ice

The test vehicle was driven on an icy road surface, and the travel distance taken upon engaging braking for the test vehicle to go from a speed of 30 km/h to 5 km/h was measured as the braking distance. The reciprocal of the braking distance for each of the examples are expressed as index values, with the reciprocal of the braking distance of the Conventional Example described below being assigned as the reference (index value of 100). Larger index values indicate shorter braking distance and superior braking ability on ice.

Controllability on Ice

Two evaluator drivers drove the test vehicle on an icy road surface of a conditioned closed course and performed a subjective evaluation of controllability. The two scores were averaged and expressed as index values with the score of the Conventional Example being assigned as the reference (index value of 100). Larger index values indicate superior controllability on ice.

Additionally, a sum of the index values of pin drop resistance, braking ability on ice, and controllability on ice of 303 or greater was evaluated as the pin drop resistance and braking ability and controllability on icy road surfaces being achieved in a compatible manner, and a sum of 306 or greater was evaluated as the pin drop resistance and braking properties and controllability on icy road surfaces being achieved in a compatible manner to a high degree.

Tables 1 and 2 show the various parameters and evaluation results of the Conventional Example, Comparative Examples, and Examples.

"Shape of first and second smallest rectangle circumscribing profile shape" in Tables 1 and 2 refers to the shape of either the first or second smallest rectangle illustrated in FIG. 4B. For the Conventional Example, "circle" refers to the flange profile shape of the lower flange and not the shape of the first and second smallest rectangle. For Comparative Examples 3 and 4 and the Examples, the ratio of the length of the short side to the length of the long side of the "rectangle" is 1:1.13.

In the "protrusion number (first flange protrusion portion F1, second flange protrusion portion F2)" in Tables 1 and 2, in the case of the number of first flange protrusion portions F1 being even, the number protruding in the direction on both sides in the longitudinal direction was the same. The number of the second flange protrusions F2 was even in all cases, and the number protruding in the direction on both sides in the lateral direction was the same. When the number of the first flange protrusion portions F1 is three, the number protruding in the direction on both sides of the longitudinal direction was 2 and 1, and when the number of first flange protrusion portions F1 is 5, the number protruding in the direction on both sides in the longitudinal direction was 3 and 2.

In "Recess depth of first flange recess portion F3> or = or <recess depth of second flange recess portion F4" in Tables 1 and 2, "F3=F4" indicates that the recess depths are equal, "F3>F4" indicates that the recess depth of the first flange recess portion F3 is greater than the recess depth of the second flange recess portion F4, and "F3<F4" indicates that the recess depth of the second flange recess portion F4 is greater than the recess depth of the first flange recess portion F3".

Here, in Comparative Examples 1 and 4 in which the number of first flange protrusion portions F1 is two, no first flange recess portions F3 are provided. In this case, the recess depth of the second flange recess portion F4 is defined as the recess depth of the second flange recess portion F4 in Comparative Examples 2, and 3.

In "Tip profile shape" in Table 2, "FIG. 4B" means the tip profile shape 66 illustrated in FIG. 4B, "convex octagon" means a tip profile shape which is a regular octagon disposed with the tip linear portions parallel with the short sides and the long sides are included in the tip profile shape, and "concave tetradecagon" means a tip profile shape which is two regular octagons connected sharing one side.

In "number of tip linear portions (first flange recess portion F3 and second flange recess portion F4" in Table 2, when focused on one first flange recess portion F3, the number of tip linear portions extending in a direction conforming to the first flange recess portion F3 is indicated, and when focused on one second flange recess portion F4, the number of tip linear portions extending in a direction conforming to the second flange recess portion F4 is indicated.

TABLE 1-1

|  | Conventional Example | Comparative Example 1 | Comparative Example 2 |
|---|---|---|---|
| Shape of first and second smallest rectangle circumscribing profile shape | Circle | Square | Square |
| Protrusion number (first flange protrusion portion F1, second flange protrusion portion F2) | — | 2, 2 | 4, 2 |
| Recess depth of first flange recess portion F3 > or = or < recess depth of second flange recess portion F4 | — | — | F3 = F4 |
| Flange linear portion F5 | — | Yes | Yes |
| Tip profile shape | Circular | Circular | Circular |
| Pin drop resistance (%) | 55 | 90 | 92 |
| Braking ability on ice | 100 | 102 | 103 |
| Controllability on ice | 100 | 101 | 102 |

TABLE 1-2

|  | Comparative Example 3 | Comparative Example 4 | Comparative Example 5 |
|---|---|---|---|
| Shape of first and second smallest rectangle circumscribing profile shape | Rectangle | Rectangle | Rectangle |
| Protrusion number (first flange protrusion portion F1, second flange protrusion portion F2) | 3, 2 | 2, 4 | 4, 2 |
| Recess depth of first flange recess portion F3 > or = or < recess depth of second flange recess portion F4 | F3 = F4 | — | F3 = F4 |

TABLE 1-2-continued

|  | Comparative Example 3 | Comparative Example 4 | Comparative Example 5 |
|---|---|---|---|
| Flange linear portion F5 | Yes | Yes | Yes |
| Tip profile shape | Circular | Circular | Circular |
| Pin drop resistance (%) | 94 | 94 | 95 |
| Braking ability on ice | 104 | 102 | 104 |
| Controllability on ice | 102 | 102 | 103 |

TABLE 2-1

|  | Example 1 | Example 2 | Example 3 |
|---|---|---|---|
| Shape of first and second smallest rectangle circumscribing profile shape | Rectangle | Rectangle | Rectangle |
| Protrusion number (first flange protrusion portion F1, second flange protrusion portion F2) | 4, 2 | 5, 2 | 4, 2 |
| Recess depth of first flange recess portion F3 > or = or < recess depth of second flange recess portion F4 | F3 = F4 | F3 = F4 | F3 > F4 |
| Flange linear portion F5 | Yes | Yes | Yes |
| Tip profile shape | FIG. 4B | FIG. 4B | FIG. 4B |
| Number of tip linear portions (first flange recess portion F3 and second flange recess portion F4) | 2, 4 | 2, 4 | 2, 4 |
| Pin drop resistance (%) | 94 | 95 | 97 |
| Braking ability on ice | 107 | 109 | 109 |
| Controllability on ice | 105 | 106 | 106 |

TABLE 2-2

|  | Example 4 | Example 5 | Example 6 |
|---|---|---|---|
| Shape of first and second smallest rectangle circumscribing profile shape | Rectangle | Rectangle | Rectangle |
| Protrusion number (first flange protrusion portion F1, second flange protrusion portion F2) | 4, 2 | 4, 2 | 4, 2 |
| Recess depth of first flange recess portion F3 > or = or < recess depth of second flange recess portion F4 | F3 > F4 | F3 = F4 | F3 = F4 |
| Flange linear portion F5 | No (Protruding arc shape) | Yes | Yes |
| Tip profile shape | FIG. 4B | Convex octagon | Concave tetradecagon |
| Number of tip linear portions (first flange recess portion F3 and second flange recess portion F4) | 2, 4 | 2, 2 | 2, 4 |
| Pin drop resistance (%) | 97 | 95 | 94 |
| Braking ability on ice | 107 | 105 | 107 |
| Controllability on ice | 105 | 103 | 105 |

As seen from comparing the Conventional Example, Comparative Examples 1 to 5, and Examples 1 to 6, a configuration in which the flange profile shape 62 of the lower flange 56 has an anisotropic shape with the first smallest rectangle or the second smallest rectangle circumscribing the flange profile shape 62 being a rectangle, the flange profile shape 62 includes four or more first flange protrusion portions F1 projecting toward the longitudinal direction L and two second flange protrusion portions F2 projecting toward the lateral direction S, the tip profile shape 66 includes the tip linear portions, and at least one of the tip linear portions extends along the portion between protrusion portions, can provide pin drop resistance and controllability and braking and driving properties on icy road surfaces in a compatible manner.

As seen from comparing Examples 2 and 3, a configuration in which the recess depth of the first flange recess portion F3 and the recess depth of the second flange recess portion F4 being equal poses no problems in terms of the evaluation result, however a configuration in which the recess depth of the first flange recess portion F3 is greater than the recess depth of the second flange recess portion F4 has improved pin drop resistance.

Also, as seen from comparing Examples 1 and 5, when four or more linear portions are provided extending along the second flange recess portion F4 for each second flange recess portion F4, pin drop resistance and braking ability and controllability on icy road surfaces can be achieved in a compatible manner to a high degree.

A stud pin and a studded tire according to an embodiment of the present technology have been described above. However, it should be understood that the present technology is not limited to the above embodiments and examples and may be improved or modified in various ways so long as these improvements or modifications remain within the scope of the present technology.

The invention claimed is:

1. A stud pin installable in a studdable tire, comprising:
a tip comprising an end surface that comes into contact with a road surface;
a body portion that supports the tip so that the tip projects from an end surface on one side of the body portion; and
a lower flange connected to an end of the body portion on an opposite side to the end surface;
a flange profile shape of the lower flange as viewed from an arrangement direction of the tip, the body portion, and the lower flange being an anisotropic shape in which, of imaginary rectangles circumscribing the flange profile shape, a first smallest rectangle with a shortest side of its four sides being a smallest and/or a second smallest rectangle with a longest side of its four sides being a smallest comprise short sides and long sides of different lengths;
the flange profile shape comprising four or more first flange protrusion portions that project toward a longitudinal direction of the flange profile shape and two second flange protrusion portions that project toward a lateral direction of the flange profile shape;
a tip profile shape of the tip as viewed from the arrangement direction being a shape comprising tip linear portions extending in a linear manner;
at least one of the tip linear portions extending along a portion of the flange profile shape along an outer circumference of the flange profile shape between two adjacent protrusion portions of the first flange protrusion portions and the second flange protrusion portions;
the first flange protrusion portions being constituted by two pairs of the first flange protrusion portions;
the flange profile shape comprising two first flange recess portions curved toward a centroid of the flange profile shape and disposed between each of the pairs of the first flange protrusion portions and four second flange recess portions curved toward the centroid, disposed between each of the second flange protrusion portions and one of the first flange protrusion portions, and smoothly connect to one of the first flange protrusion portions; and a recess depth of the first flange recess portions being greater than a recess depth of the second flange recess portions; wherein the two second flange protrusion portions comprise two flange linear portions parallel with the longitudinal direction; and the flange linear portions are portions projecting the most in the lateral direction.

2. The stud pin according to claim 1, wherein the tip profile shape comprises, as the tip linear portions, two tip linear portions C1 extending along a portion of the flange profile shape between each of the two pairs of the first flange protrusion portions and four or more tip linear portions C2 extending along a portion of the flange profile shape between each of the second flange protrusion portions and one of the first flange protrusion portions.

3. The stud pin according to claim 2, wherein the tip linear portions C1 are disposed facing the first flange recess portions, and the tip linear portions C2 are disposed facing the second flange recess portions.

4. The stud pin according to claim 2, wherein the tip profile shape comprises two tip recess portions recessed toward a centroid of the tip profile shape; and the tip recess portions comprise two of the tip linear portions connected together.

5. A studded tire that is a studdable tire installed with the stud pin described in claim 4, the tip profile shape of the stud pin being an anisotropic shape with a length of the tip profile shape in the longitudinal direction parallel with the long sides being different from a length of the tip profile shape in the lateral direction parallel with the short sides, the studded tire comprising:

a tread portion in which the stud pin is installed with the longitudinal direction of the tip profile shape facing a tire lateral direction.

6. The studded tire according to claim 5, wherein the tread portion is installed with the stud pin with the longitudinal direction of the flange profile shape or the lateral direction of the flange profile shape facing a tire circumferential direction.

7. The stud pin according to claim 1, wherein the tip profile shape comprises two tip recess portions recessed toward a centroid of the tip profile shape; and the tip recess portions comprise two of the tip linear portions connected together.

8. A studded tire that is a studdable tire installed with a stud pin, the stud pin comprising:

a tip comprising an end surface that comes into contact with a road surface;

a body portion that supports the tip so that the tip projects from an end surface on one side of the body portion; and a lower flange connected to an end of the body portion on an opposite side to the end surface;

a flange profile shape of the lower flange as viewed from an arrangement direction of the tip, the body portion, and the lower flange being an anisotropic shape in which, of imaginary rectangles circumscribing the flange profile shape, a first smallest rectangle with a shortest side of its four sides being smallest and/or a second smallest rectangle with a longest side of its four sides being smallest comprise short sides and long sides of different lengths;

the flange profile shape comprising four or more first flange protrusion portions F1 that project toward a longitudinal direction and two second flange protrusion portions F2 that project toward a lateral direction;

a tip profile shape of the tip as viewed from the arrangement direction being a shape comprising tip linear portions extending in a linear manner;

at least one of the tip linear portions extending along a portion of the flange profile shape along an outer circumference of the flange profile shape between two adjacent protrusion portions of the first flange protrusion portions F1 and the second flange protrusion portions F2;

the tip profile shape of the stud pin being an anisotropic shape with a length of the tip profile shape in the longitudinal direction parallel with the long sides being different from a length of the tip profile shape in the lateral direction parallel with the short sides;

the first flange protrusion portions being constituted by two pairs of the first flange protrusion portions;

the flange profile shape comprising two first flange recess portions curved toward a centroid of the flange profile shape and disposed between each of the pairs of the first flange protrusion portions and four second flange recess portions curved toward the centroid, disposed between each of the second flange protrusion portions and one of the first flange protrusion portions, and smoothly connect to one of the first flange protrusion portions;

a recess depth of the first flange recess portions being greater than a recess depth of the second flange recess portions; and the studded tire comprising:

a tread portion in which the stud pin is installed with the longitudinal direction of the tip profile shape facing a tire lateral direction; wherein the two second flange protrusion portions comprise two flange linear portions parallel with the longitudinal direction; and the flange linear portions are portions projecting the most in the lateral direction.

9. The studded tire according to claim 8, wherein the tread portion is installed with the stud pin with the longitudinal direction of the flange profile shape or the lateral direction of the flange profile shape facing a tire circumferential direction.

\* \* \* \* \*